(12) United States Patent
Takazawa

(10) Patent No.: US 6,368,026 B1
(45) Date of Patent: Apr. 9, 2002

(54) SPHERICAL BODY TRANSPORT APPARATUS

(75) Inventor: Toru Takazawa, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/564,703

(22) Filed: May 4, 2000

(30) Foreign Application Priority Data

May 12, 1999 (JP) .............................. 11-131230

(51) Int. Cl.$^7$ .............................................. B65G 53/08
(52) U.S. Cl. ........................... 406/68; 406/64; 406/110; 406/148
(58) Field of Search .............................. 406/62, 63, 64, 406/68, 85, 109, 110, 129, 148

(56) References Cited

U.S. PATENT DOCUMENTS

| | | | | |
|---|---|---|---|---|
| 3,649,081 A | * | 3/1972 | Johnson et al. ............... 302/31 |
| 3,907,373 A | * | 9/1975 | Jensen et al. ................. 302/14 |
| 5,431,410 A | * | 7/1995 | Hampton ..................... 273/397 |
| 6,102,629 A | * | 8/2000 | Ishida et al. .................. 406/52 |
| 6,203,249 B1 | * | 3/2001 | Ishida et al. .................. 406/85 |
| 6,257,804 B1 | * | 7/2001 | Gathmann .................... 406/68 |

* cited by examiner

Primary Examiner—Christopher P. Ellis
Assistant Examiner—Joe Dillon, Jr.
(74) Attorney, Agent, or Firm—Smith, Gambrell & Russell, LLP

(57) ABSTRACT

A spherical body transport apparatus applicable in accepting a small spherical body, such as a spherical semiconductor, from a first spherical body treating device and feeding it to a second spherical body treating device. Such a spherical body transport apparatus includes a spherical body holding component having at least one spherical body accommodating component and designed to hold a spherical body temporarily, a spherical body carry-in component for carrying the spherical body into the spherical body accommodating component of the spherical body holding component, and a spherical body carry-out component for carrying the spherical body out of the spherical body accommodating component of the spherical body holding component.

3 Claims, 4 Drawing Sheets

SPHERICAL BODY TRANSPORT APPARATUS

FIELD OF THE INVENTION

This invention relates to a spherical body transport apparatus suitable for transporting a small spherical body such as a spherical semiconductor. More specifically, the invention relates to a spherical body transport apparatus which can be applied in accepting a small spherical body from a first spherical body treating device and feeding it to a second spherical body treating device.

DESCRIPTION OF THE PRIOR ART

Recently, it has been proposed to form an integrated circuit on the surface of a spherical semiconductor such as spherical silicon, called ball semiconductor. Such a spherical semiconductor is a small spherical body with a diameter of, for example, about 1 mm. Prior to forming the integrated circuit on the surface of the spherical semiconductor, it is necessary to polish the surface of the spherical semiconductor thoroughly. Japanese Patent Application No. 11-119490 (Title of the Invention: Ball Polishing Device, Filing date: Apr. 27, 1999), assigned to the assignee of the present invention), discloses a polishing device suitable for polishing the surface of a spherical semiconductor. To polish the spherical semiconductor with the use of such a polishing device in the actual production of a spherical semiconductor, it is important to install not only the polishing device, but also a transport device for feeding the spherical semiconductor, which has undergone a treating step performed before a polishing step, to the polishing device, and a transport device for delivering the spherical semiconductor, which has been polished by the polishing device, to a subsequent treating step. However, a spherical body transport apparatus, which can be used preferably in the transport of a small spherical body such as a spherical semiconductor, has not been realized so far.

SUMMARY OF THE INVENTION

A principal object of the present invention is to provide a novel spherical body transport apparatus which can be used preferably in the transport of a small spherical body such as a spherical semiconductor.

The invention provides, as a spherical body transport apparatus which attains this object, a spherical body transport apparatus comprising spherical body holding means for holding a spherical body temporarily, the spherical body holding means having at least one spherical body accommodating means; spherical body carry-in means for carrying the spherical body into the spherical body accommodating means of the spherical body holding means; and spherical body carry-out means for carrying the spherical body out of the spherical body accommodating means of the spherical body holding means.

The spherical body accommodating means of the spherical body holding means preferably has a shape and dimensions suitable for accommodating only one spherical body. Preferably, the spherical body holding means has a plurality of the spherical body accommodating means, and repeatedly brings each of the spherical body accommodating means to a spherical body carry-in position and a spherical body carry-out position sequentially; the spherical body carry-in means carries the spherical body into the spherical body accommodating means located at the spherical body carry-in position; and the spherical body carry-out means carries the spherical body out of the spherical body accommodating means located at the spherical body carry-out position. The spherical body holding means preferably includes a rotating disk disposed rotatably, and a rotational drive source for rotating the rotating disk. Preferably, a plurality of the spherical body accommodating means are disposed with spacing in a circumferential direction in the rotating disk. The spherical body accommodating means of the spherical body holding means can be composed of a recess open at an upper surface of the rotating disk and having a semispherical bottom surface. In the rotating disk, it is advantageous that a vent extending from the bottom surface of each of the recesses to a lower surface of the rotating disk is formed. Advantageously, the vent has a cross sectional shape and dimensions which do not allow the spherical body to pass therethrough. The spherical body carry-in means is advantageously composed of carry-in path means communicating with an upper surface of the recess at the spherical body carry-in position, and suction means for sucking a gas through the carry-in path means, the recess and the vent to carry the spherical body, as an accompaniment to the sucked gas, from the carry-in path means into the recess. The spherical body carry-out means is advantageously composed of carry-out path means communicating with the upper surface of the recess at the spherical body carry-out position, and blowing means for blowing a gas through the vent, the recess, and the carry-out path means to carry the spherical body, as an accompaniment to the blown gas, out of the recess to the carry-out path means. Preferably, the carry-in path means and the carry-out path means each have a cross sectional shape and dimensions suitable for permitting passage of only one spherical body.

DETAILED DESCRIPTION OF THE PREFFERED EMBODIMENTS

Preferred embodiments of a spherical body transport apparatus constituted in accordance with the present invention will now be described in further detail with reference to the accompanying drawings.

Figure 1:
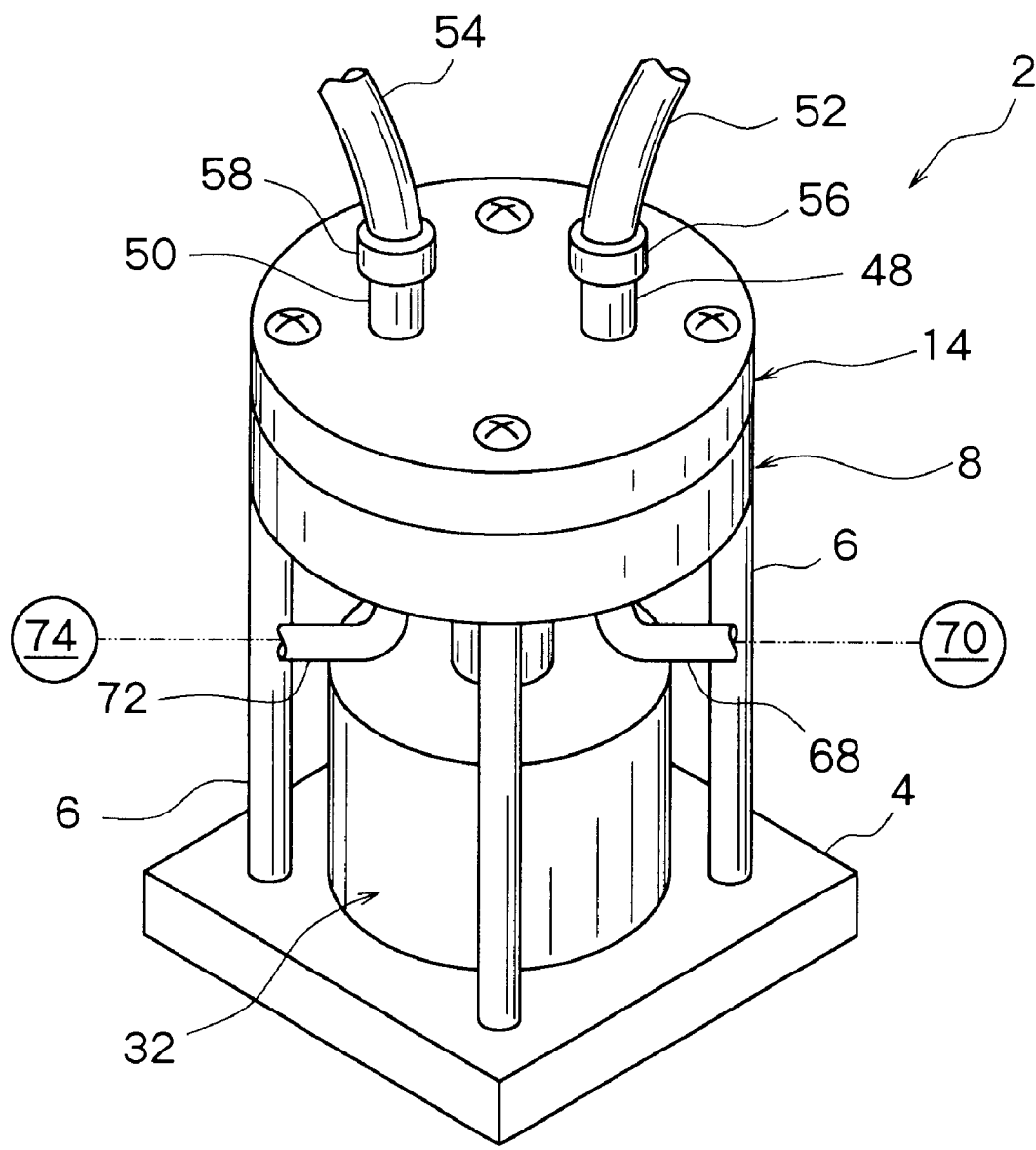
FIG. 1 is a perspective view showing a preferred embodiment of a spherical body transport apparatus constituted in accordance with the present invention.
Figure 2:
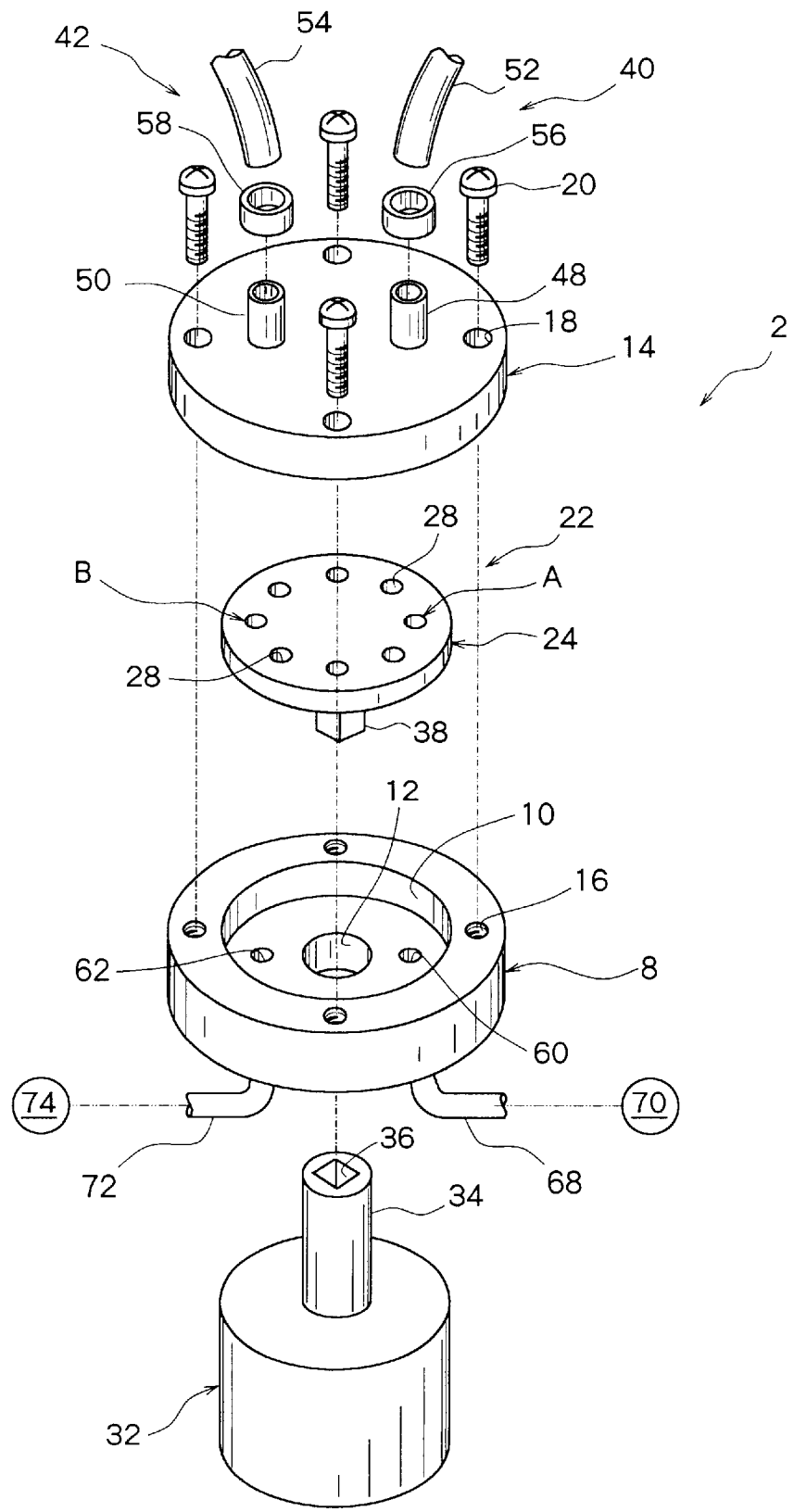
FIG. 2 is an exploded perspective view of the spherical body transport apparatus shown in FIG. 1.
Figure 3:
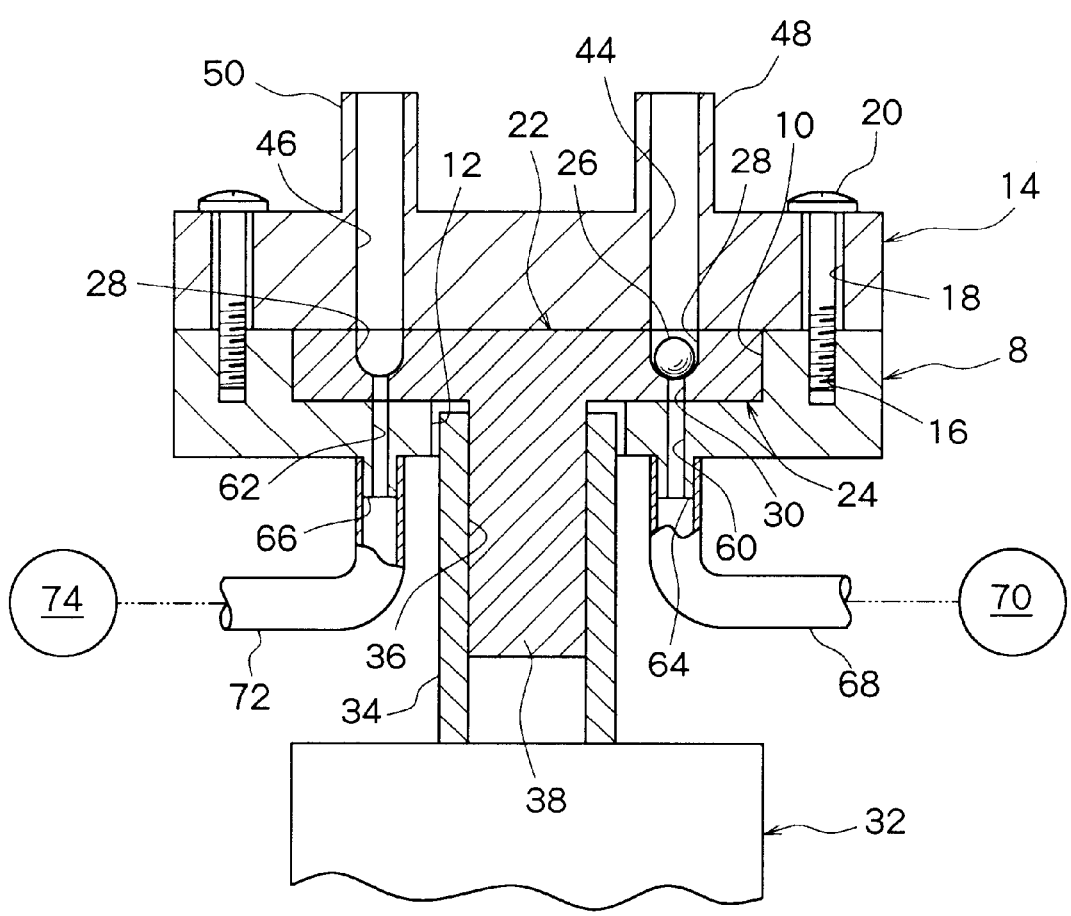
FIG. 3 is a sectional view of the spherical body transport apparatus shown in FIG. 1.

FIGS. 1, 2 and 3 show a preferred embodiment of a spherical body transport apparatus constituted in accordance with the invention. The illustrated spherical body transport apparatus designated entirely as the numeral 2 has a stationary board 4 which may be shaped like a square plate, as shown in FIG. 1. On the stationary board 4, four support pillars 6 (three of them are shown in FIG. 1) extending substantially vertically upwardly are fixed by a suitable method, such as bonding. To an upper end of each of the four support pillars 6, a lower stationary disk 8 is fixed by a suitable method, such as bonding. As will be understood clearly from FIGS. 2 and 3, a circular depression 10 is formed in the center of an upper surface of the lower stationary disk 8 disposed substantially horizontally. In the lower stationary disk 8, a through-hole 12 positioned in the enter of the circular depression 10 is further formed. The cross sectional shape of the through-hole 12 may be circular. Onto the lower stationary disk 8, an upper stationary disk 14 is fixed. As clearly illustrated in FIG. 2, four tapped holes 16 are formed with equal angular spacing in a circumferential direction in a peripheral edge portion of an upper surface of the lower stationary disk 8. In the upper stationary disk 14, four through-holes 18 are formed with equal angular spacing in the circumferential direction. Clamping bolts 20 are screwed into the tapped holes 16 of the lower stationary disk 8 through the through-holes 18 of the upper stationary disk 14 to fix the upper stationary disk 14 onto the lower stationary disk 8. An upper surface of the circular depression 10 formed in the lower stationary disk 8 is covered with the upper stationary disk 14.

Referring to FIGS. 2 and 3, the spherical body transport apparatus 2 has spherical body holding means 22. The spherical body holding means 22 in the illustrated embodiment includes a rotating disk 24 rotatably mounted in the circular depression 10 of the lower stationary disk 8. In the rotating disk 24, a plurality of spherical body accommodating means 28 for accommodating spherical bodies 26, which are carried into the spherical body holding means 22 in a manner to be described later on, are disposed with equal angular spacing in a circumferential direction. The spherical body 26 is, for example, a spherical semiconductor with a diameter of about 1 mm. Each of the spherical body accommodating means 28 is composed of a recess open at an upper surface of the rotating disk 24. An upper half of the recess is defined by a cylindrical side wall extending substantially vertically, and a lower half of the recess is defined by a semispherical bottom surface. The diameter of the cylindrical side wall and the diameter of the semispherical bottom surface in the recess are substantially the same as, or slightly greater than, the diameter of the spherical body 26 accommodated in the recess. The recess constituting the spherical body accommodating means 28 is provided with a vent 30 which extends substantially vertically from the center of the bottom surface or the recess to a lower surface of the rotating disk 24. It is important for the vent 30 to have a cross sectional shape and dimensions which will not allow the spherical body 26 to pass through the vent 30. The vent 30 in the illustrated embodiment has a circular cross sectional shape having a sufficiently smaller diameter than the diameter of the spherical body 26.

The spherical body holding means 22 also includes a rotational drive source 32 for rotating the rotating disk 24. The rotational drive source 32 is composed of a pulse motor fixed on the stationary board 4. An output shaft 34 of the pulse motor extends substantially vertically upwardly, and is admitted into the through-hole 12 formed in the lower stationary disk 8. In the output shaft 34, a connecting hole 36 extending downward from an upper end of the output shaft 34 is formed. The connecting hole 36 has a square cross section. On the lower surface of the rotating disk 24, an input shaft 38 extending downward from the center of the lower surface is formed integrally. The input shaft 38 has a square cross section corresponding to the cross sectional shape of the connecting hole 36 formed in the output shaft 34. The input shaft 38 is inserted into the connecting hole 36 of the output shaft 34 to connect the input shaft 38 to the output shaft 34, so that the rotating disk 24 is drivably connected to the rotational drive source 32. The rotational drive source 32 intermittently rotates the rotating disk 24 to a predetermined angle in a predetermined direction. As a result, each of the spherical body accommodating means 28 disposed in the rotating disk 24 is sequentially brought to a spherical body carry-in position A and also sequentially brought to a spherical body carry-out position B. In the illustrated embodiment, the spherical body carry-in position A and the spherical body carry-out position B are placed at a 180-degree angular distance. If desired, the rotating disk 24 can be continuously rotated at a required speed.

With reference to FIGS. 1, 2 and 3, the spherical body transport apparatus 2 comprises spherical body carry-in means 40 for carrying the spherical body 26 into the spherical body accommodating means 28 of the rotating disk 24 at the spherical body carry-in position A, and spherical body carry-out means 42 for carrying the spherical body 26 out of the spherical body accommodating means 28 of the rotating disk 24 at the spherical body carry-out position B. In further detail, a pair of through-holes 44 and 46 extending substantially vertically are formed in the upper stationary disk 14. At an upper surface of the upper stationary disk 14, connecting cylinders 48 and 50 protruding upward from the peripheral edge of the through-holes 44 and 46 are fixed by a suitable method, such as bonding. The through-holes 44 and 46 are positioned in alignment with the spherical body carry-in position A and the spherical body carry-out position B, respectively. To the connecting cylinders 48 and 50, a flexible carry-in hose 52 and a flexible carry-out hose 54 are connected, respectively, by coupling rings 56 and 58 which may be in a well known shape. The cross sectional shapes of the through-holes 44 and 46, connecting cylinders 48 and 50, and hoses 52 and 54 may be circular, and the inner diameters of these members are substantially the same, and they are the same as or slightly larger than the diameter of the spherical body 26. In the lower stationary disk 8, a pair of through-holes 60 and 62 are formed which extend substantially vertically from the bottom wall of the circular depression 10 to the lower surface of the lower stationary disk 8. At the lower surface of the lower stationary disk 8, annular connecting protrusions 64 and 66 protruding downward from the peripheral edge of the through-holes 60 and 62 are formed integrally. The through-holes 60 and 62 are positioned in alignment with the spherical body carry-in position A and the spherical body carry-out position B, respectively. To the connecting protrusion 64, an end of a flexible suction hose 68 is connected, and the other end of the flexible suction hose 68 is connected to suction means 70 which may be a vacuum pump. To the connecting protrusion 66, an end of a flexible blowing hose 72 is connected, and the other end of the blowing hose 72 is connected to blowing means 74 such as an air compressor. The cross sectional shapes of the through-holes 60 and 62 and the hoses 68 and 72 may be circles with relative small diameters. As will be understood clearly from a description to be given later on, the carry-in hose 52, connecting cylinder 48, through-hole 44, through-hole 60, suction hose 68, and suction means 70 constitute the spherical body carry-in means 40. Whereas the blowing means 74, blowing hose 72, through-hole 62, through-hole 46, connecting cylinder 50, and carry-out hose 54 constitute the spherical body carry-out means 42.

In the above-described spherical body transport apparatus 2, the carry-in hose 52 connected at one end to the connecting cylinder 48 has the other end connected to a spherical body feeding hopper or a suitable spherical body treating device (not shown). The carry-out hose 54 connected at one end to the connecting cylinder 50 has the other end connected to a spherical body collecting hopper or a suitable spherical body treating device (not shown). When the spherical body transport apparatus 2 is actuated, a gas, which may be air, is sucked through the carry-in hose 52, connecting cylinder 48, through-hole 44, one of the spherical body accommodating means 28 (i.e., the spherical body accommodating means 28 located at the spherical body carry-in position A) formed in the rotating disk 24, vent 30, through-hole 60, and suction hose 68 by the action of the suction means 70. As a result, the spherical body 26 is sucked from the spherical body feeding hopper or suitable spherical body treating device, and accommodated in one of the spherical body accommodating means 28. The inner diameter of the vent 30 provided for the spherical body accommodating means 28 is sufficiently small compared with the diameter of the spherical body 26. Thus, the spherical body 26 accommodated in the spherical body accommodating means 28 is not sucked into the vent 30. As regard the spherical body accommodating means 28 located at the spherical body carry-out position B, a gas, such as compressed air, fed from the blowing means 74 is blown through the blowing hose 72, through-hole 62, vent 30, one of the spherical body accommodating means 28 (i.e., the spherical body accommodating means 28 located at the spherical body carry-out position B) formed in the rotating disk 24, through-hole 46, connecting cylinder 50, and carry-out hose 54. As a result, the spherical body 26 accommodated in the spherical body accommodating means 28 is carried outward through the through-hole 46, connecting cylinder 50, and carry-out hose 54, and transported to the spherical body collecting hopper or suitable spherical body treating device. Under these circumstances, when the rotating disk 24 is intermittently rotated in the predetermined direction to bring the spherical body accommodating means 28 sequentially to the spherical body carry-in position A, the spherical body 26 is carried into the spherical body accommodating means 28 by the action of the spherical body carry-in means 40. The spherical body 26 carried into the spherical body accommodating means 28 is temporarily held in the spherical body accommodating means 28, and moved in accordance with the rotation of the rotating disk 24 to the spherical body carry-out position B. When the spherical body 26 has been moved to the spherical body carry-out position B, the spherical body 26 accommodated in the spherical body accommodating means 28 is carried out of the spherical body accommodating means 28 by the action of the spherical body carry-out means 42.

In the spherical body transport apparatus 2 explained with reference to FIGS. 1, 2 and 3, one spherical body carry-in means 40 and one spherical body carry-out means 42 are disposed for one rotating disk 24. If desired, for one rotating disk 24, a plurality of the spherical body carry-in means 40 and/or the spherical body carry-out means 42 can be disposed with required angular spacing in the circumferential direction of the rotating disk 24. For example, when the treating capacity of the spherical body treating device disposed upstream from the spherical body transport apparatus 2 is twice the treating capacity of the spherical body treating device disposed downstream from the spherical body transport apparatus 2, one spherical body carry-in means 40 and two spherical body carry-out means 42 can be disposed for one rotating disk 24. In this case, the blowing means 74 of the two spherical body carry-out means 42 disposed in conjunction with separate spherical body carry-out positions are actuated alternately in accordance with the operation of the one spherical body carry-in means 40, whereby the spherical body 26 accommodated in the spherical body accommodating means 28 of the rotating disk 24 by the one spherical body carry-in means 40 can be carried outward alternately by the two spherical body carry-out means 42.

Figure 4:
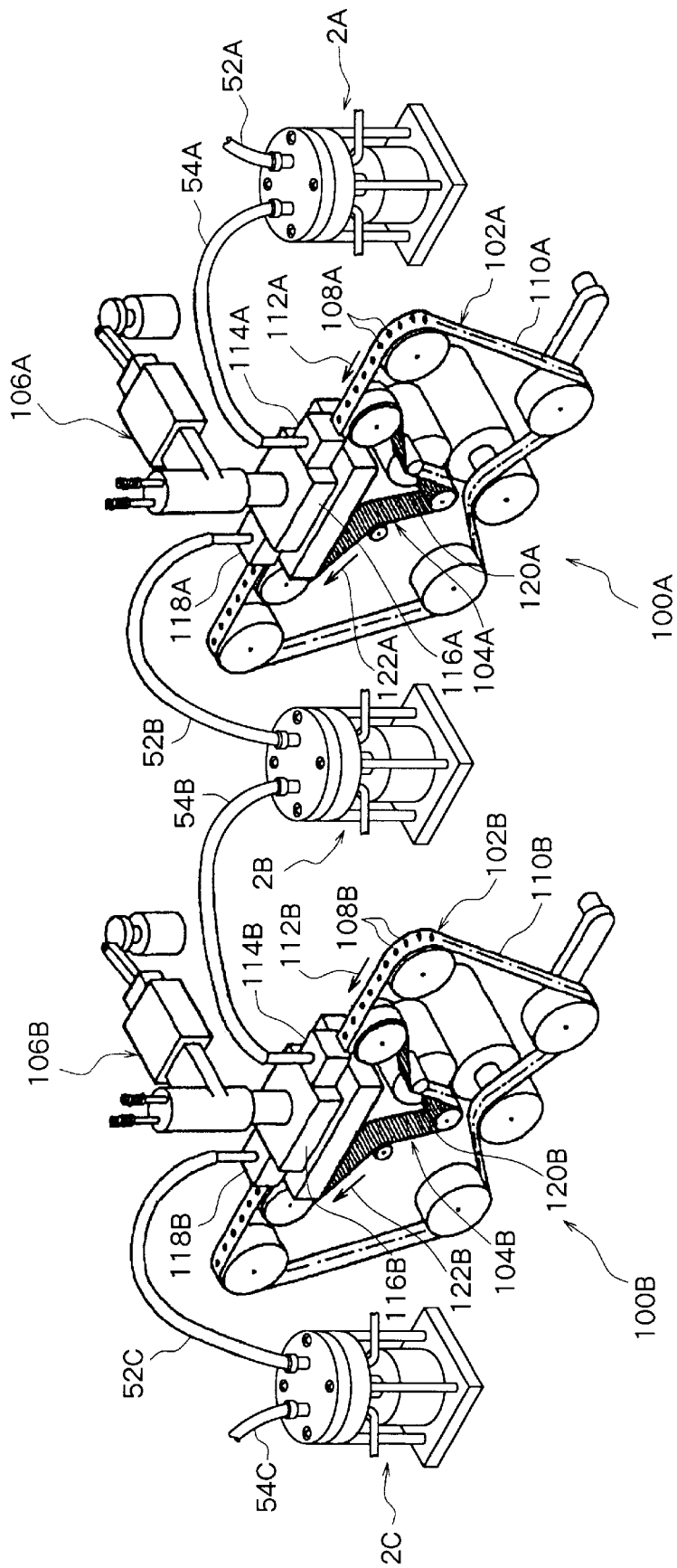
FIG. 4 is a perspective view showing an example of a spherical body polishing system using the spherical body transport apparatus shown in FIG. 1.

FIG. 4 shows a spherical body polishing system comprising two spherical body polishing devices, i.e., a primary spherical body polishing device 100A for polishing a spherical body roughly, and a secondary spherical body polishing device 100B for polishing the spherical body finely, and spherical body transport apparatuses 2A, 2B and 2C connected to these polishing devices and having a configuration as described with reference to FIGS. 1, 2 and 3. The spherical body polishing devices 100A and 100B include spherical body transport belt means 102A and 102B, polishing belt means 104A and 104B, and spherical body turning means 106A and 106B. The spherical body transport belt means 102A and 102B have endless belts 110A and 110B having a multiplicity of spherical body accommodating openings 108A and 108B formed with suitable spacing in a longitudinal direction. The endless belts 110A and 110B are driven in directions indicated by arrows 112A and 112B, and moved sequentially through a charging station covered with a cover 114A or 114B, a polishing station covered with a cover 116A or 116B, and a withdrawal station covered with a cover 118A or 118B. The polishing belt means 104A includes a rough polishing belt 120A driven in a direction indicated by an arrow 122A. The polishing belt means 104B includes a fine polishing belt 120B driven in a direction indicated by an arrow 122B.

An upstream end of a carry-in hose 52A of the spherical body transport apparatus 2A is connected to a spherical body feeding hopper (not shown). A lower end of a carry-out hose 54A is positioned in the charging station of the primary spherical body polishing device 10A. An upstream end of a carry-in hose 52B of the spherical body transport apparatus 2B is positioned in the withdrawal station of the primary spherical body polishing device 100A. A lower end of a carry-out hose 54B is positioned in the charging station of the secondary spherical body polishing device 100B. An upstream end of a carry-in hose 52C of the spherical body transport apparatus 2C is positioned in the withdrawal station of the secondary spherical body polishing device 100B. A lower end of a carry-out hose 54C is connected to a spherical body collecting hopper (not shown).

In the primary spherical body polishing device 101A in the spherical body polishing system as illustrated in FIG. 4, when the endless belt 110A of the spherical body transport belt means 102A passes through the charging station, a spherical body transported from the spherical body feeding hopper via the spherical body transport apparatus 2A is accommodated in the spherical body accommodating opening 108A. During passage of the endless belt 110A through the polishing station, the rough polishing belt 120A driven in the direction of the arrow 122A acts on the spherical body accommodated in the spherical body accommodating opening 108A to perform rough polishing of the spherical body. The spherical body turning means 106A randomly turns the spherical body accommodated in the spherical body accommodating opening 108A so that the entire surface of the spherical body will undergo the rough polishing action of the rough polishing belt 120A sufficiently uniformly. While the endless belt 110A is passing through the withdrawal station, the spherical body accommodated in the spherical body accommodating opening 108A is sucked into the carry-in hose 52B of the spherical body transport apparatus 2B. In the secondary spherical body polishing device 100B, when the endless belt 110B of the spherical body transport belt means 102B passes through the charging station, the spherical body transported from the primary spherical body polishing device 100A via the spherical body transport apparatus 2B is accommodated in the spherical body accommodating opening 108B. During passage of the endless belt 110B through the polishing station, the fine polishing belt 120B driven in the direction of the arrow 122B acts on the spherical body accommodated in the spherical body accommodating opening 108B to perform fine polishing of the spherical body. The spherical body turning means 106B randomly turns the spherical body accommodated in the spherical body accommodating opening 108B so that the entire surface of the spherical body will undergo the fine polishing action of the fine polishing belt 120B sufficiently uniformly. While the endless belt 110B is passing through the withdrawal station, the spherical body accommodated in the spherical body accommodating opening 108B is sucked into the carry-in hose 52C of the spherical body transport apparatus 2C. The spherical body sucked into the carry-in hose 52C of the spherical body transport apparatus 2C is transported to the spherical body collecting hopper via the spherical body transport apparatus 2C.

The primary spherical body polishing device 100A and the secondary spherical body polishing device 100B in the spherical body polishing system illustrated in FIG. 4 may have the configuration disclosed in detail in the specification and drawings of the aforementioned Japanese Patent Application No. 11-119490 assigned to the assignee of the present invention. Hence, the entire disclosure of Japanese Patent Application No. 11-119490, including the specification, claims, drawings and summary, is incorporated herein by reference in its entirety, and details of the constitution of these spherical body polishing devices are omitted herein.

The preferred embodiments of the spherical body transport apparatus constituted in accordance with the present invention have been described in detail with reference to the accompanying drawings. It should be understood that the invention is not restricted to such embodiments, but various changes and modifications may be made without departing from the spirit and scope of the invention.

What I claim is:

1. A spherical body transport apparatus comprising:

(a) spherical body holding means for temporarily holding a spherical body, the spherical body holding means including a rotating disk disposed rotatably, and a rotational drive source for rotating the rotating disk, and a plurality of spherical body accommodating means disposed with spacing in a circumferential direction in the rotating disk and composed of a recess open at an upper surface of the rotating disk and having a semispherical bottom surface, wherein the bottom surface of each recess has a vent extending from the bottom surface to a lower surface of the rotating disk, the vent having a cross sectional shape and dimensions which do not allow the spherical body to pass through the vent;

(b) spherical body carry-in means for carrying a spherical body into the spherical body accommodating means, the carry-in means being composed of carry-in path means communicating with an upper surface of the recess at the spherical body carry-in position, and suction means for sucking a gas through the carry-in path means, the recess and the vent to carry the spherical body, as an accompaniment to the sucked gas, from the carry-in path means into the recess; and (c) spherical body carry-out means for carrying the spherical body out of the spherical body accommodating means, the carry-out means being composed of carry-out path means communicating with the upper surface of the recess at the spherical body carry-out position, and blowing means for blowing a gas through the vent, the recess, and the carry-out path means to carry the spherical body, as an accompaniment to the blown gas, out of the recess to the carry-out path means; wherein the spherical body holding means repeatedly brings each of the spherical body accommodating means to a spherical body carry-in position and a spherical body carry-out position sequentially;

the spherical body carry-in means carries the spherical body into one of the spherical body accommodating means located at the spherical body carry-in position; and the spherical body carry-out means carries the spherical body out of the spherical body accommodating means located at the spherical body carry-out position.

2. The spherical body transport apparatus of claim 1, wherein:

at least one of the spherical body accommodating means of the spherical body holding means has a shape and dimensions suitable for accommodating only one spherical body.

3. The spherical body transport apparatus of claim 1, wherein:

the carry-in path means and the carry-out path means each have a cross sectional shape and dimensions suitable for permitting passage of only one spherical body.

* * * * *